UNITED STATES PATENT OFFICE.

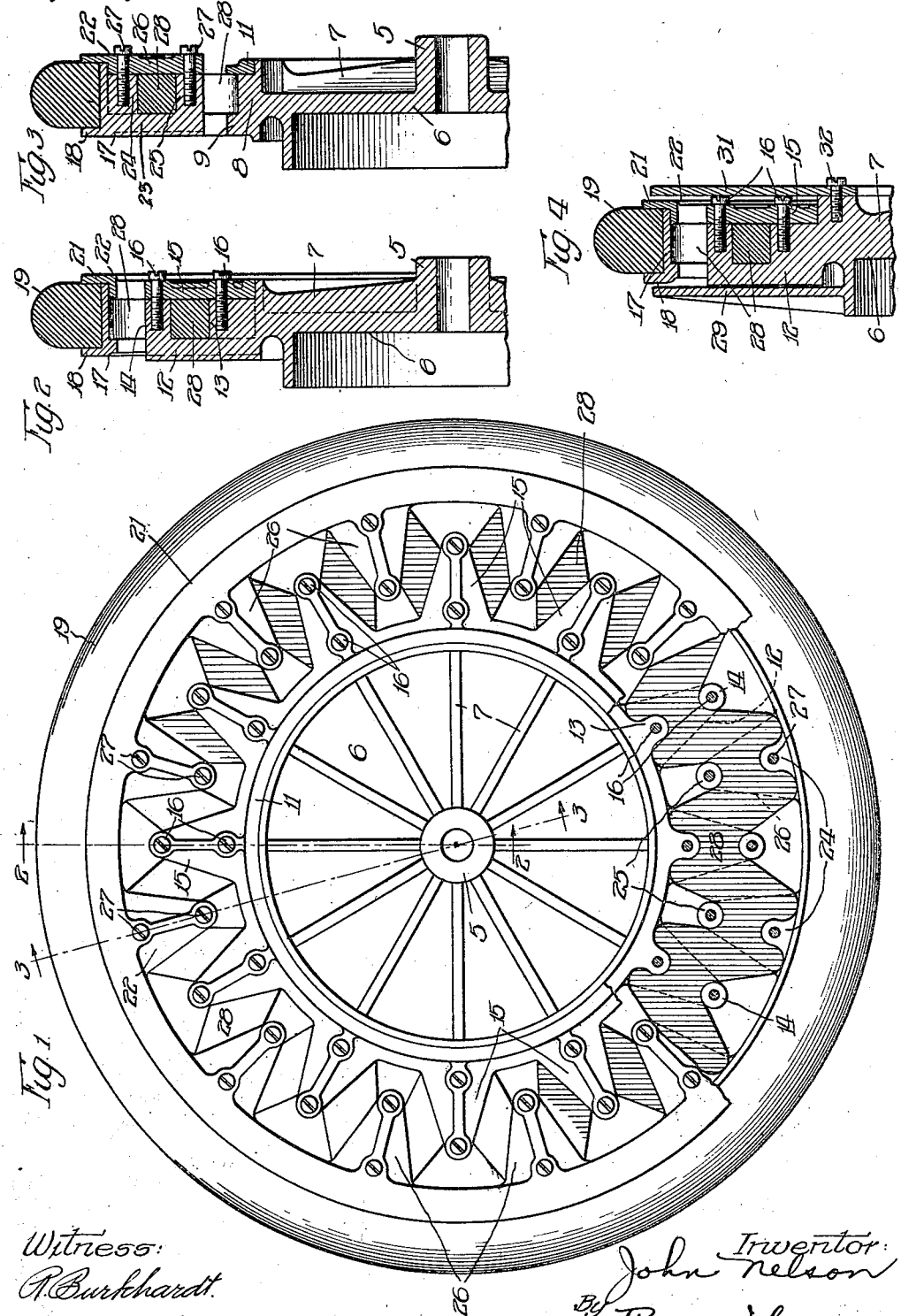

JOHN NELSON, OF CHICAGO, ILLINOIS.

CUSHION-WHEEL.

1,394,779.           Specification of Letters Patent.    Patented Oct. 25, 1921.

Application filed May 27, 1920. Serial No. 384,523.

*To all whom it may concern:*

Be it known that I, JOHN NELSON, a citizen of the United States, residing at Chicago, in the county of Cook and State of Illinois, have invented certain new and useful Improvements in a Cushion-Wheel, of which the following is a specification.

This invention relates in general to vehicle wheels, and while capable of use on any road vehicle, it is particularly adapted for heavy vehicles, such as automobile trucks and the like, and aims to provide a cushion wheel which will absorb the shocks and jars incident to travel of the wheel over uneven surfaces and reduce their transmission to the axle and to the vehicle body.

I am aware that cushion wheels of various types have heretofore been employed, but in such wheels, the load is carried on the radius extending between the hub and the point of contact of the wheel with the ground. Consequently, the cushion of rubber, or other material employed, is entirely under compression along this line and the cushion throughout the remainder of its area around the wheel is idle and ineffective except for the short interval in which it crosses the line of carrying force of the load as the wheel revolves.

The primary purpose of my present invention is the provision of a wheel in which the cushion element will be active at all times throughout the entire circumference of the wheel, thus distributing the load throughout the area of the wheel as distinguished from a concentration of the load along a single radial line, as has heretofore been customary.

Another object of my invention is to provide a wheel in which the cushion element when carrying a load will be largely under tension, only a small portion thereof being under compression at any one time. This feature adds to the resiliency and easy riding qualities of the wheel because the elasticity of rubber which constitutes the cushion element is much greater under tension than under compression since its compressibility is relatively small in comparison with its extensibility.

A further object of my invention is to provide a wheel which will be strong and durable, capable of transmitting power from the hub to the perimeter, and of withstanding the side thrusts imparted thereto, and at the same time possess limited lateral flexibility so that it may yield to some extent in passing over or around stones and the like.

Still another object is to provide a wheel which will require a minimum amount of rubber in the cushion member, one in which the cushion member is not assembled under compression, and one which can be economically manufactured and readily assembled.

Other objects and many of the attendant advantages of my invention will be readily appreciated as the same becomes better understood by reference to the following description when considered in connection with the accompanying drawings.

Referring to the drawings:

Figure 1 is a side elevation of a wheel embodying my invention, certain portions being broken away to more clearly disclose the wheel structure;

Figs. 2 and 3 are fragmentary sectional views taken on the radial lines 2—2 and 3—3 respectively of Fig. 1; and Fig. 4 is a view similar to Fig. 2 of a slightly modified form of my invention.

By reference to the drawings, it will be observed that the hub 5 of the wheel is provided with an integral surrounding web 6, strengthened by radially disposed ribs 7, the circumference of the web being shaped to provide a rim 8. This rim, as will be apparent from Fig. 3, is equipped at one side with an integral flange 9 forming an abutment, and opposed to this flange at the opposite face of the wheel is a removable ring 11 providing an opposing flange, between which flanges the cushion member to be later described, is disposed.

At regular spaced intervals around the rim 8, the flange 9 is extended outwardly to provide a series of tapered members 12, each equipped with transversely disposed inner and outer studs 13 and 14 respectively. The ring 11 likewise is equipped with similarly spaced and similarly shaped radially projecting members 15, adapted to be disposed in opposed relation to the members 12, the studs 13 and 14 of which are tapped to receive cap screws 16, by which the ring 11 is rigidly secured to the members 12 so as to form a portion of the inner rim of the wheel.

Surrounding the inner rim is an outer rim 17, provided at one side with a radially projecting flange 18 forming one retaining side for the tire 19, the opposite side of the tire being retained by the similarly shaped flange 21 of a detachable ring 22. Projecting inwardly from the rim 17 in regularly spaced relation, corresponding to the spacing of the outward projections 12 on the inner rim, there is a series of members 23, each formed to provide transversely disposed outer and inner studs 24 and 25 respectively. The ring 22 is similarly equipped with correspondingly shaped and correspondingly arranged inward projections 26 adapted to be disposed in opposition to the members 23, the studs 24 and 25 of which are tapped to receive cap screws 27 passing through the members 26, by which the ring 22 is rigidly secured to the rim 17 so as to form a part thereof.

These inner and outer rims of the wheel, constructed as described, are connected together by an interposed cushion member 28, preferably made of rubber or other material possessing similar characteristics, and integrally formed to provide a ring of zig-zag shape, adapted to be interposed between the rims. From Fig. 1, it will be observed that this zig-zag shaped cushion member has its inner apices seated in the sockets formed by the members 12 in conjunction with the members 15 and between the studs 13 and 14, so that the member is held against separation from the inner rim and that similarly, its outer apices are seated in the sockets formed by the members 23 and 26 and between the studs 24 and 25, so that the member is also held against separation from the outer rim. Each apex is provided with a concavity to fit around the studs 13 and 24, upon the inner and outer rims respectively, thus affording a bearing surface against the faces of the rims through which compression strains are received and transmitted.

Since the connections of the cushion member to the respective rims are disposed in alternation, it will be manifest that the cushion member does not contact with both the inner and outer rims on any radius of the wheel. Consequently, no compression strains are transmitted directly from the outer rim to the hub on a radial line, but on the contrary, all compression strains are transmitted at an angle through the inclined elements of the cushion member so that each element is placed under compression at one side and under tension at the opposite side. As the result of this construction, any weight on the hub places the cushion member under tension throughout the entire perimeter of the wheel, certain portions of the member being under compression at the bottom of the wheel and portions also at the sides while directly above the center, the member is wholly under tension. By this construction, therefore, the entire cushion member becomes effective in carrying the load so that the load is not concentrated along a line directly beneath the hub as has been customary in cushion wheels previous to my invention. The load is therefore carried with a minimum of shock, and since a rubber cushion member possesses greater extensibility than compressibility, the carrying of the greater part of the load by tension rather than compression increases the riding qualities of the wheel.

In some instances, it may be found that the cushion member itself might be subjected to excessive strains if it were relied upon solely to withstand the side thrusts of the wheel and therefore, for the purpose of absorbing the side thrusts when they become so excessive as to unduly distort the cushion member, my invention contemplates the provision of a pair of flanges 29 and 31, as shown in Fig. 4, which are mounted on the wheel hub and project radially outwardly so as to overlie the outer rim at each side thereof. These flanges may be attached to the hub in any suitable manner, but I have shown for purposes of illustration, flange 29 as cast integrally with the hub and flange 31, which is in effect a disk, as secured to the hub by bolts 32. It will be apparent that the circumferential margins of these two flanges are disposed at opposite sides of the outer rim 17 and are spaced therefrom to provide clearance, which permits a limited degree of lateral flexibility between the inner and outer rims, which enables the wheels to travel around slight obstructions, but when a predetermined degree of lateral distortion has taken place, the side thrust will be transmitted directly through one or the other of these flanges to the hub of the wheel so as to prevent undue distortion of the cushion member.

It will be manifest that my zig-zag form of cushion member embodies less rubber than the customary annular solid cushion member of equal diametral thickness and is accordingly cheaper to manufacture and furthermore, since it is secured to the outer as well as to the inner rim, it is assembled in the wheel in normal condition, i. e., without being under stress, as distinguished from the prior wheels in which the cushion member must be forced into place under compression and remains under compression at all times.

It is believed that my invention, its construction, and mode of operation will be understood from the foregoing without further description, but it should be manifest that the invention is capable of embodiment in structures differing materially in the details from those illustrated and described, without departing from the spirit of the invention as defined in the appended claims.

I claim:

1. A cushion wheel, comprising an inner rim provided on its periphery with a series of radially projecting laterally opening sockets, an outer rim provided on its inner perimeter with a series of inwardly projecting laterally opening sockets arranged in alternation with and radially overlapping said inner rim sockets, a continuous zig-zag shaped resilient member seated in the successive sockets and forming the sole connection between said rims, a ring provided with radially disposed projections closing said inner rim sockets and secured thereto, and a ring provided with projections extending radially inwardly and closing the outer rim sockets secured thereto whereby said resilient member is retained in the respective sockets.

2. A cushion wheel comprising an inner rim provided with radially projecting sockets open at one side, an outer rim provided with similar sockets projecting radially inwardly from said rim and open at one side, the sockets of the respective rims being disposed in alternation and in overlapping relation, a zig-zag shaped resilient member seated in the respective sockets, a ring attached to said inner rim and provided with radial projections closing the open sides of said inner sockets, and a ring attached to said outer rim and provided with inwardly extending projections closing the open sides of said outer sockets.

3. A cushion wheel comprising inner and outer rims provided with overlapping sockets arranged in alternation and in spaced relation around the wheel, each of said sockets being open at one side, a zig-zag shaped resilient member seated in said sockets and connecting the rims together, an inner ring having outward projections for closing the open sides of said inner sockets, an outer ring having inward projections for closing the open sides of said outer sockets, and means for securing said rings to their respective rims.

4. A cushion wheel comprising an inner rim member provided with laterally opening sockets, an outer rim member provided with similar laterally opening sockets arranged in alternation with the sockets of said inner rim member, a ring secured to said inner rim member and having provisions for closing the sides of said inner rim member sockets, a ring secured to said outer rim member and having similar provisions for closing the sides of the laterally opening sockets of said outer rim member, and a zig-zag shaped cushion member seated in said sockets and forming the sole connection between said rim members.

JOHN NELSON.